United States Patent [19]

Warren

[11] 4,447,175
[45] May 8, 1984

[54] CUTTING INSERT
[75] Inventor: Donald W. Warren, Latrobe, Pa.
[73] Assignee: Kennametal Inc., Latrobe, Pa.
[21] Appl. No.: 389,406
[22] Filed: Jun. 17, 1982

Related U.S. Application Data

[63] Continuation of Ser. No. 181,770, Aug. 27, 1980, abandoned, which is a continuation-in-part of Ser. No. 116,679, Jan. 30, 1980, abandoned.

[51] Int. Cl.³ ............................................. B26D 1/00
[52] U.S. Cl. .................................... 407/114; 407/116
[58] Field of Search ......................... 407/113, 114, 116

[56] References Cited

U.S. PATENT DOCUMENTS

| | | | |
|---|---|---|---|
| 3,395,434 | 8/1968 | Wirfelt | 407/114 |
| 3,781,956 | 1/1974 | Jones et al. | 407/113 |
| 3,973,307 | 8/1976 | McCreery et al. | 407/114 |
| 3,973,308 | 8/1976 | Lundgren | 407/114 |
| 3,975,809 | 8/1976 | Sorice et al. | 407/114 |
| 4,215,957 | 8/1980 | Holma et al. | 407/114 |
| 4,218,160 | 8/1980 | Arnold | 407/114 |
| 4,273,480 | 6/1981 | Shirai et al. | 407/114 |

FOREIGN PATENT DOCUMENTS 2031311  4/1980  United Kingdom .............. 407/114

*Primary Examiner*—Leonidas Vlachos
*Attorney, Agent, or Firm*—Lawrence R. Burns

[57] ABSTRACT

A cutting insert within indexable cutting edges with a chipbreaker configuration which comprises discrete recesses spaced along the length of the cutting insert. The cutting insert has a descending wall that joins the cutting edge or the land behind the cutting edge with a planar floor that extends toward the center of the insert. The recesses are formed in the descending wall adjacent the cutting edge or land behind the cutting edge and are concave facing outwardly as they extend inwardly of the insert. The inserts are coated, preferably, with a TiN over TiC chemical vapor deposition coating.

4 Claims, 9 Drawing Figures

CUTTING INSERT

RELATED APPLICATION

This is a continuation of application Ser. No. 181,770, filed Aug. 27, 1980, which was a continuation-in-part of application Ser. No. 116,679, filed Jan. 30, 1980, now abandoned.

BACKGROUND OF THE INVENTION

This invention concerns cutting inserts and is especially concerned with a unique chipbreaker configuration that is molded into a face of a hard wear resistant material.

Indexable and invertable cutting inserts are known that may be releasably held in a pocket of a toolholder while removing material from a workpiece. A wide variety of chipbreaker configurations are known for use with such inserts and comprise separate super structures that help clamp the insert in the pocket of the toolholder and also include configurations that can be molded into one of the top or bottom faces of the cutting insert. Cutting inserts with the molded chipbreaker groove are usually formed of a hard wear resistant material such as a ceramic or cemented hard metal carbide material.

The wide variety of grooves molded in such material may best be reviewed by perusing U.S. Pat. Nos. 4,140,431, granted to Friedline et al; 4,068,976, granted to Friedline; 3,975,809, granted to Sorice et al; and 3,781,956, granted to Jones et al; 3,973,307, granted to McCreery et al; and U.S. Pat. No. 4,180,355, granted to Nanini, and assigned to Societe Igman.

In addition, cutting inserts are known that have planar parallel top and bottom faces with spherical dimples spaced along the cutting edges of the insert formed in one of the planar parallel surfaces and spaced along the cutting edge of the insert.

It is an object of the present invention to provide a bettter chipbreaking configuration in a molded chipbreaker on a cutting insert.

It is a further object of the present invention to impart to the chip material to be removed a stiffer and stronger configuration so that the chip will break more easily.

It is a further object of the present invention to try to reduce the energy required to remove material such as metal from a workpiece.

BRIEF SUMMARY OF THE INVENTION

According to the present invention, a cutting insert is provided with a body of hard wear resistant material, preferably a cemented hard metal carbide, such as tungsten carbide or a ceramic material. The body has top and bottom faces with a peripheral wall joining the faces such that the body has a polygonal shape when viewed in plan. Cutting edges are formed at the juncture of the peripheral wall with at least one of the top and bottom faces and may or may not have land areas formed behind the cutting edges.

A descending wall, preferably planar in nature, extends from the cutting edge or the land behind the cutting edge downwardly and toward the center of the body until it joins a planar floor that extends also toward the center of the insert body. Individual discrete recesses are formed and spaced along the length of the cutting edge in the uppermost portion of said planar descending wall. The recesses are formed so that they are concave facing outwardly as they extend from the cutting edge inwardly of the cutting insert body. Preferably, the recesses have a rectangular configuration when viewed in plan with preferably planar side walls bounding the recesses as they extend from the land behind the cutting edge toward the center of the insert body.

Preferably, the cutting insert has angularly related cutting edges that form an imaginary plane in relation to the rest of the insert. The recesses are, preferably, uniformly shaped and from portions of an imaginary cylinder having a longitudinal axis that runs substantially parallel to the adjacent cutting edge. The innermost parts of the recesses from the cutting edge join the descending wall of the insert and the loci of these junctures are preferably formed so as to substantially lie in an imaginary line drawn through the junctures along one cutting edge. An imaginary plane can be formed through the cutting edge and imaginary line, this second imaginary plane forming an acute included angle with the first imaginary plane formed by the angularly related cutting edges.

Preferably, the recesses form portions of an imaginary cylinder having a radius of approximately 0.030 to 0.050 inches and the distance to the bottom of said recess from said second imaginary plane is in the range of from 0.003 to 0.005 inches.

BRIEF DESCRIPTION OF THE DRAWINGS

The exact nature of the present invention will become more clearly apparent upon reference to the following detailed specification taken in connection with the accompanying drawings in which.

DETAILED DESCRIPTION OF THE INVENTION

Figure 1:
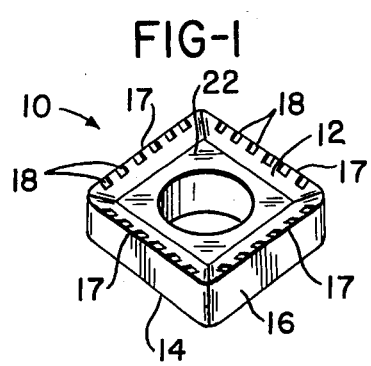
FIG. 1 is a perspective view of an insert according to the present invention.

Referring to the drawings somewhat more in detail, what is shown in FIG. 1 is the cutting insert 10 comprised of a body of hard wear resistant material, such as a cemented hard metal carbide, having a top face 12 and bottom face 14 that are joined by peripheral wall 16 extending therebetween. Cutting edges 17 are formed at the juncture of the peripheral wall 16 with the top face 12 of insert 10. Recesses 18 are formed in the top face 12 and spaced along the cutting edge 17.

Figure 2:
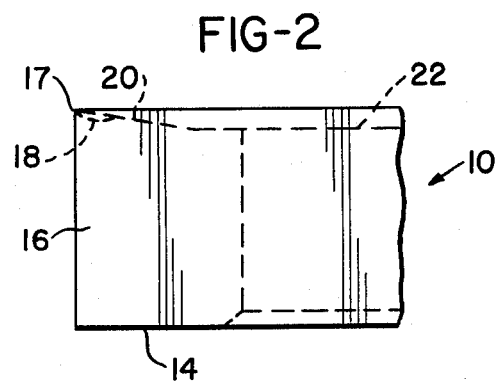
FIG. 2 is a partial cut-away of a side view of an insert according to the present invention.

Shown more clearly in FIG. 2, the cutting insert 10 has the top and bottom faces 12 and 14 with the peripheral wall 16 joining said top and bottom faces. In the top face 12, there is a cutting edge 17 and a descending wall portion 20 that extends downwardly and inwardly from the cutting edge 17 until it meets a planar floor 22 that extends toward the center of the insert 10.

Figure 3:
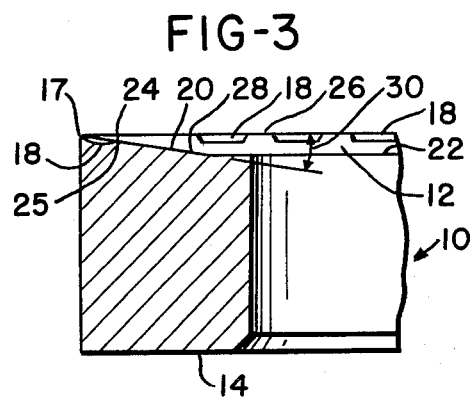
FIG. 3 is a cross sectional view of an insert according to the present invention.

Shown in FIG. 3 is a cross section of the insert 10; however, this time taken through one of the recesses 18 formed along the cutting edge 17 of the insert 10. As can be seen, the insert 10 is formed in the descending wall 20. Preferably, the descending wall 20 is planar in nature. When viewed in a side cross sectional view, the recess 18 is concave facing upwardly or outwardly of the insert body 10.

Recess 18 has a juncture line 24 where the innermost portion of the recess 18 joins the planar wall 20. Preferably, the cutting edges 17 of the cutting insert 10 are angularly related and define an imaginary plane as at 26 in FIG. 3. Further, the loci of all the junctures 24 of the recesses 18 would lie in an imaginary line that would extend into the paper of FIG. 3 and lie adjacent to the cutting edge 17 of the insert 10. The point of this line is illustrated as at 25 in FIG. 3.

A first imaginary plane 26 is defined as containing the angularly related cutting edges 17 and the second imaginary plane 28 is formed and is defined as containing a cutting edge 17 along with the adjacent imaginary line 26. These first and second imaginary planes 26 and 28 form an acute included angle as shown at 30 in FIG. 3. Preferably, the angle shown at 30 in FIG. 3 is approximately 15 degrees, although it is believed it could lie in the range of from 10 to 20 degrees.

Figure 3A:
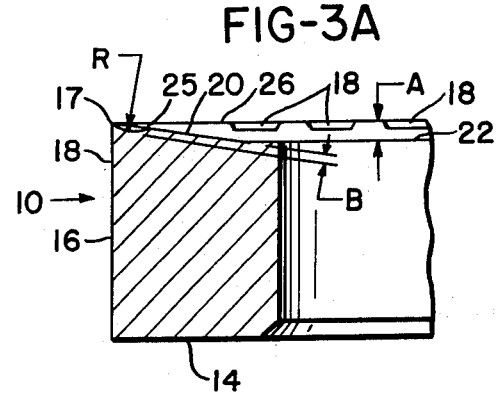
FIG. 3A is a similar view to that shown in FIG. 3.

FIG. 3A shows the same picture as that shown in FIG. 3 but very clearly pointing out more dimensional relationships of the cutting insert according to the present invention. As is mentioned in FIG. 3, the imaginary planes 26 and 28 are shown having an acute included angle which is preferably about 10 degrees. The perpendicular distance between the first defined imaginary plane of the cutting edges 17 and the planar floor 22 of the cutting insert 10 is shown by dimension A in the drawing. Dimension A is preferably 0.018 inches, plus or minus 0.005 inches.

The recesses 18 may be defined as being portions of a right circular cylinder whose longitudinal axis runs substantially parallel to the cutting edge 17 of the insert 10. Shown in FIG. 3A, the cylinder would have a radius R where R is preferably 0.043 inches, plus or minus 0.005 inches, although wider ranges may be used, depending upon the feeds and speeds with which the insert is intended to be used.

The recess 18 has a lowermost point that may be measured as a perpendicular distance from the second imaginary plane 28. This lowermost point is shown at B in FIG. 3A and is preferably 0.005 inches, plus or minus 0.001 inches, although this depth could range from 0.002 to 0.010 inches, depending upon cutting conditions. The recess 18 is shown as it extends from the cutting edge 17 inwardly until it joins the descending wall 20 of the cutting insert 10, and this distance is, preferably, 0.040 inches, plus or minus 0.003 inches, although the distance may also range from 0.020 to 0.050 inches, depending upon feed conditions. When viewed in plan, the recesses are preferably square in appearance, having a length along the cutting edges that equals the distance that the recess extends inwardly of the cutting insert 10 from the cutting edge 17.

Figure 4:
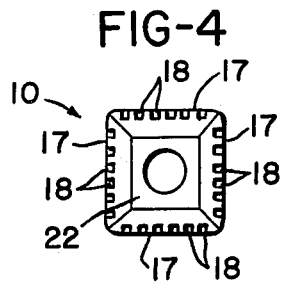
FIG. 4 is a plan view of an insert according to the present invention.

Referring to FIG. 4, shown therein is a plan view of the cutting insert 10 having recesses 18 spaced around the four cutting edges 17. As can be seen in the plan view, the recesses 18 have a rectangular or square shape when viewed in plan, and as shown more clearly in FIGS. 5 and 6, the recesses 18 have side walls 30 that bound the recesses 18 as they extend inwardly from the cutting edge 17 to their juncture 19 with descending wall 20.

Figure 6:
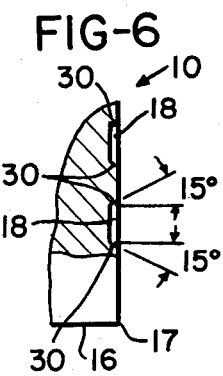
FIG. 6 is a partial cross section showing the side walls of the recesses in the insert according to the present invention.

Shown more clearly in FIG. 6, the side walls 30 are shown having a preferable 15 degree angle with the perpendicular drawn to the planar surface of the descending wall 20.

Figure 5:
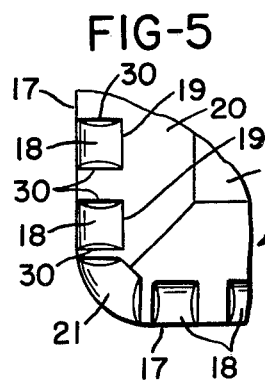
FIG. 5 is an enlarged plan view of a corner of an insert according to the present invention.

Further, shown in FIG. 5 is an enlarged recess 21 that is designed to extend across the joining corners of a polygonal insert, as shown in FIG. 4.

It has been found that, when using an insert according to the above-described invention, it appears to break chips that are being removed from a workpiece, especially when working with metal and other like substances.

Figure 7:
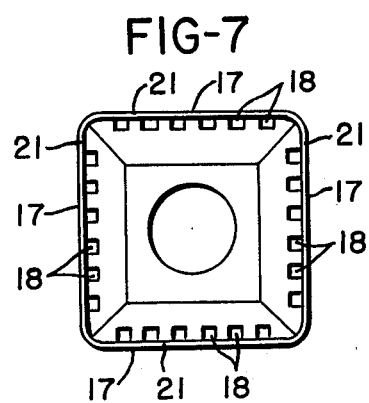
FIG. 7 is a plan view of a modified cutting edge according to the present invention having a land area behind the cutting edge.
Figure 8:
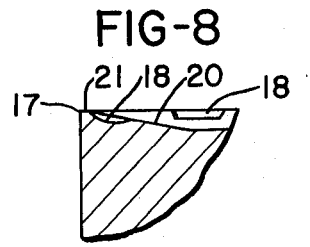
FIG. 8 is a partial cross sectional view of a cutting insert shown in FIG. 7.

Even more preferably, in FIG. 7, is shown a cutting insert having a landed area 21 located behind the cutting edge 17 and extending around the insert 10. The land 21 preferably has a width of approximately 0.005 inches, but may be in the range of from 0.004 to 0.030 inches.

The length of the recesses 18 measured from the cutting edge 17 inwardly of the insert 10 may vary with the size of the insert. A greater length of the recess is better when the purpose is to have lower horsepower because the recess has a larger radius of curvature and, therefore, there is less crowding of chips. When cutting stainless steel, and chip control is important, a shorter recess length may be used, but the horsepower requirement may be raised.

The inserts according to the present invention are preferably coated by any of the well-known coating processes, one of which is disclosed in applicant's own U.S. Pat. No. 4,035,541 and other coating processes, such as aluminum oxide coatings, that have been found suitable for cemented carbide cutting inserts.

Modifications may be made within the scope of the appended claims.

What is claimed is:

1. A cutting insert for removing material from a workpiece which comprises: a body that has top and bottom faces and a peripheral wall joining said faces; said body having a polygonal shape when viewed in plan; cutting edges formed at the juncture of said peripheral wall with one of said top and bottom faces; a land area extending inwardly from the cutting edge; a planar descending wall extending from the land area downwardly to a planar floor which extend toward the center of said body; individual discrete recesses for imparting a stiffer configuration to the material removed from the workpiece, said recesses formed and spaced inwardly from and along the length of the cutting edges in the upper portion of said planar descending wall; said recesses when viewed in side appearing concave facing outwardly and extending from the land area inwardly, and portions of said planar descending wall forming side walls separating and bounding said recesses.

2. A cutting insert according to claim 1 in which said cutting edge is formed at the juncture of said peripheral wall and only one of said top and bottom faces.

3. A cutting insert according to claim 1 in which recesses are uniformly shaped and form portions of an imaginary cylinder having a longitudinal axis that runs parallel to the adjacent cutting edge.

4. A cutting insert according to claim 3 in which said imaginary cylinder has a radius of from 0.030 to 0.50 inches.

* * * * *